(12) United States Patent  
Medoro et al.

(10) Patent No.: US 11,008,990 B2  
(45) Date of Patent: May 18, 2021

(54) APPARATUS AND METHOD FOR UNCLOGGING A FILTER OF A PUMPING GROUP FOR PUMPING DIESEL TO AN INTERNAL COMBUSTION ENGINE

(71) Applicant: Robert Bosch GmbH, Stuttgart (DE)

(72) Inventors: Nello Medoro, Trinitapoli (IT); Pietro De Carlo, Bitritto (IT)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 16/467,075

(22) PCT Filed: Dec. 5, 2017

(86) PCT No.: PCT/EP2017/081491  
§ 371 (c)(1),  
(2) Date: Jun. 6, 2019

(87) PCT Pub. No.: WO2018/104290  
PCT Pub. Date: Jun. 14, 2018

(65) Prior Publication Data  
US 2019/0309714 A1  Oct. 10, 2019

(30) Foreign Application Priority Data  
Dec. 6, 2016  (IT) .................... 102016000123932

(51) Int. Cl.  
*F02M 59/34* (2006.01)  
*F02M 37/30* (2019.01)  
(Continued)

(52) U.S. Cl.  
CPC ......... *F02M 59/34* (2013.01); *F02D 19/0668* (2013.01); *F02M 31/125* (2013.01);  
(Continued)

(58) Field of Classification Search  
CPC ...... F02M 59/34; F02M 37/30; F02M 31/125; F02D 19/0668; F02D 41/0025;  
(Continued)

(56) References Cited

U.S. PATENT DOCUMENTS 2,435,277 A * 2/1948 Holthouse ............... F02N 19/02  
123/179.5  
2,949,906 A * 8/1960 Voigt ....................... F02D 17/04  
123/179.3  
(Continued)

FOREIGN PATENT DOCUMENTS

CN  102635473 A   8/2012  
DE  102010062455   6/2012  
(Continued)

OTHER PUBLICATIONS

International Search Report for Application No. PCT/EP2017/081491 dated Feb. 16, 2018 (2 pages).

*Primary Examiner* — Hung Q Nguyen  
*Assistant Examiner* — Susan E Scharpf  
(74) *Attorney, Agent, or Firm* — Michael Best & Friedrich LLP

(57) ABSTRACT

Unclogging group for unclogging a filter of a pumping group for pumping diesel to an internal combustion engine, the unclogging group (1) comprising: —a metering unit (2) supplied by diesel leaving a low pressure pump and configured for feeding in a controlled manner the diesel to a high pressure pump; the metering unit (2) comprising an electromagnetic head (4) provided with a coil (6) and a control valve (5) for controlling the diesel flow; —a filter (30) associated with the control valve (5); —a temperature sensor (34) for measuring the ambient temperature; —a control unit (31) coupled at one side to the temperature sensor (34) and at another side to the coil (6); wherein the control unit (31) is configured so that once it has received the starting input (Continued)

of the pumping group it compares the temperature measured by the temperature sensor (34) with a threshold value, and if the temperature measured by the temperature sensor (34) is less than the threshold value the control unit (31) commands a delay of the starting of the pumping group of a period wherein the control unit (31) supplies electrical current to the coil (6).

10 Claims, 1 Drawing Sheet

(51) Int. Cl.
*F02D 19/06* (2006.01)
*F02M 31/125* (2006.01)
*F02D 41/00* (2006.01)
*F02D 41/06* (2006.01)
*F02D 41/38* (2006.01)
*F02N 19/04* (2010.01)

(52) U.S. Cl.
CPC ......... *F02M 37/30* (2019.01); *F02D 41/0025* (2013.01); *F02D 41/064* (2013.01); *F02D 41/3845* (2013.01); *F02D 2200/0414* (2013.01); *F02N 19/04* (2013.01); *Y02T 10/12* (2013.01); *Y02T 10/30* (2013.01)

(58) Field of Classification Search
CPC ............... F02D 41/064; F02D 41/3845; F02D 2200/0414; F02N 19/04; Y02T 10/12; Y02T 10/30
See application file for complete search history.

(56) References Cited

U.S. PATENT DOCUMENTS

| | | | | |
|---|---|---|---|---|
| 3,448,733 A * | 6/1969 | Aske | ............ | F02P 19/00 123/179.7 |
| 3,557,959 A * | 1/1971 | Muller | ............ | B01D 35/18 210/142 |
| 4,023,397 A * | 5/1977 | Ouvrard | ............ | G01N 11/08 374/24 |
| 4,245,317 A * | 1/1981 | Marchak | ............ | F02D 41/149 123/491 |
| 4,318,382 A * | 3/1982 | Eheim | ............ | F02M 41/128 123/179.17 |
| 4,321,136 A * | 3/1982 | Matsui | ............ | B01D 35/14 210/86 |
| 4,794,226 A * | 12/1988 | Derbyshire | ............ | B01D 35/18 210/184 |
| 5,881,699 A * | 3/1999 | Brown | ............ | F02M 37/36 123/514 |
| 5,942,127 A * | 8/1999 | Wilcox | ............ | B01D 35/18 210/762 |
| 6,029,629 A | 2/2000 | Tipton | | |
| 6,216,652 B1 | 4/2001 | Gramann et al. | | |
| 6,601,573 B1 * | 8/2003 | Frank | ............ | F02D 31/009 123/683 |
| 7,493,893 B2 * | 2/2009 | Funabashi | ............ | F02D 33/006 123/457 |
| 2005/0284149 A1 * | 12/2005 | Jansen | ............ | F02C 9/26 60/734 |
| 2008/0209890 A1 * | 9/2008 | Cox | ............ | F01N 3/2033 60/286 |
| 2008/0209897 A1 * | 9/2008 | Urven | ............ | F01N 3/2033 60/303 |
| 2009/0143958 A1 * | 6/2009 | Parker | ............ | F02D 41/3836 701/104 |
| 2009/0277424 A1 * | 11/2009 | Yonemoto | ............ | F02M 37/0035 123/506 |

FOREIGN PATENT DOCUMENTS

| | | | | |
|---|---|---|---|---|
| DE | 102014211942 | | 12/2015 | |
| EP | 0116419 A2 * | | 8/1984 | ............ F02M 31/125 |
| FR | 2657651 | | 8/1991 | |
| JP | S57156068 U | | 9/1982 | |
| JP | H0392686 A | | 4/1991 | |
| JP | 04203468 | | 7/1992 | |
| JP | 2000345818 A | | 12/2000 | |
| JP | 2008215332 A | | 9/2008 | |
| JP | 2012532280 A | | 12/2012 | |

* cited by examiner

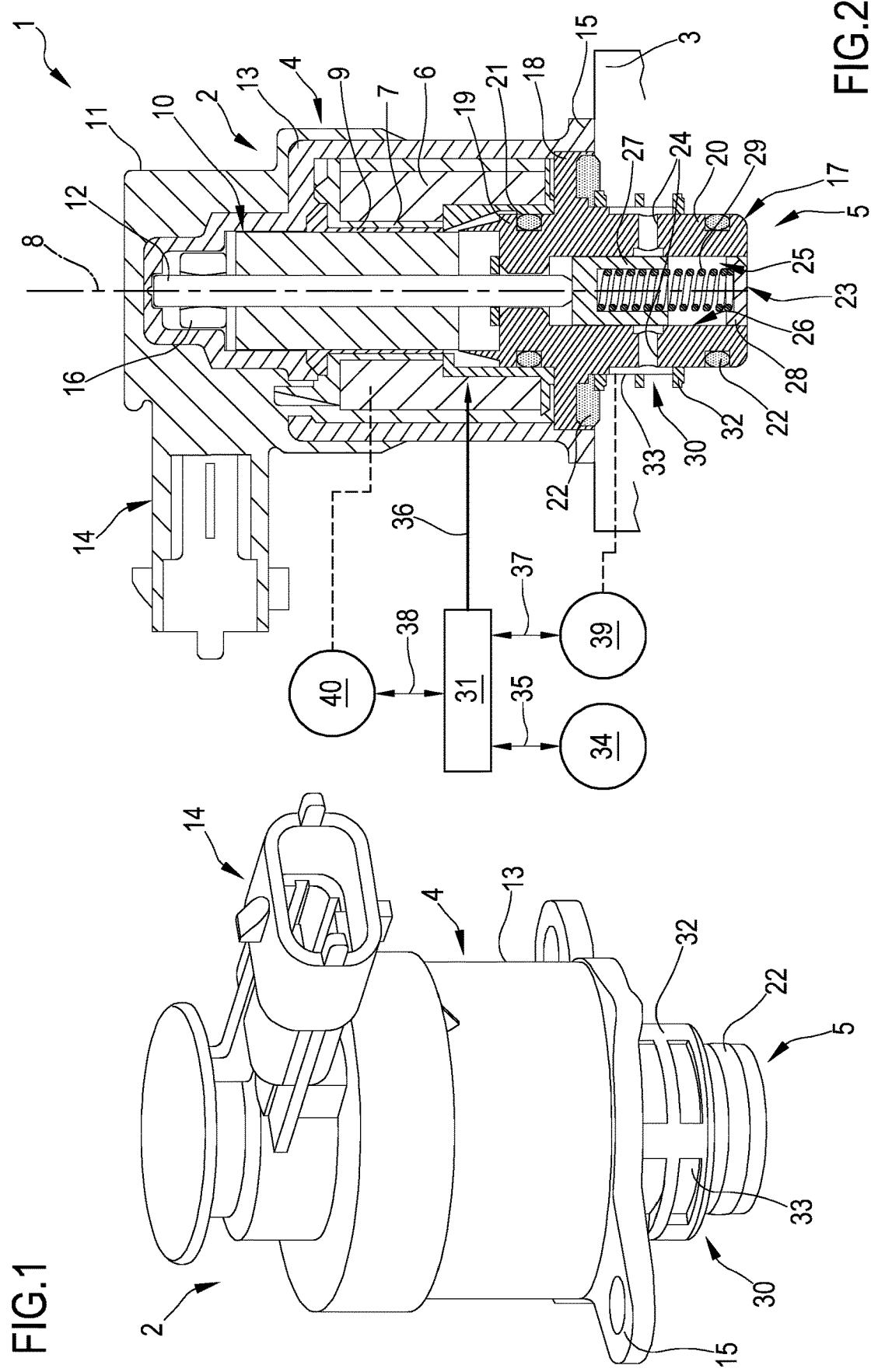

APPARATUS AND METHOD FOR UNCLOGGING A FILTER OF A PUMPING GROUP FOR PUMPING DIESEL TO AN INTERNAL COMBUSTION ENGINE

BACKGROUND OF THE INVENTION

The present invention relates to a group and to a method for unclogging, i.e. removing any clogging, a filter of a pumping group for pumping diesel to an internal combustion engine.

In particular, the present invention relates to a group and to a method for unclogging the filter associated with the metering unit, or throttle valve, arranged in the pumping group for pumping the diesel along the low pressure circuit between the low pressure pump and the high pressure pump.

As is known, when the temperature of the diesel drops beyond a specific threshold value, known in the field as "Cold Filter Plugging Point" or CFPP, the liquid diesel tends to slow down, generating a solid concentrate called paraffin which, when circulating in the pumping group, may clog the filtering devices provided along the circuit.

The CFPP threshold value precisely indicates the temperature at which the diesel no longer flows within a specific time inside a specific filter because it is excessively clogged by the paraffin.

The greatest problems linked to this phenomenon arise along the low pressure circuit of the pumping group, i.e. along the circuit which connects the low pressure pump, generally a gear pump, to the high pressure pump, generally a pump with pumping pistons, because it is in this section that the diesel may be at low temperatures linked to the temperatures of the external environment.

When using standard diesel, i.e. not "Arctic" diesel or diesel with added anti-freeze agents, during winter, there is a real risk of paraffin being deposited on the filters of the pumping group. When this paraffin deposit on the filters appears, the cold starting of the engine may become critical.

One filter which is particularly exposed to this risk is the filter associated with the throttle valve, which is arranged in the pumping group for pumping the diesel precisely along the low pressure circuit between the low pressure pump and the high pressure pump. When this filter becomes clogged with paraffin, a barrier is formed, preventing the diesel from being supplied to the intake valve, and it is therefore not possible to correctly turn on the engine.

Proceeding from this prior art, it is an object of the present invention to provide a group and a method for unclogging, i.e. removing any paraffin clogging, the filter associated with the metering unit, or throttle valve, arranged in the pumping group for pumping the diesel along the low pressure circuit between the low pressure pump and the high pressure pump.

SUMMARY OF THE INVENTION

The present invention provides a group comprising:
 a metering unit, or throttle valve, provided with a control valve and with an electromagnetic head provided with a coil, wherein the metering unit is configured for receiving diesel from a low pressure pump and for feeding it in a controlled manner to a high pressure pump;
 a filter associated with the control valve;
 a temperature sensor for measuring the ambient temperature;
 a control unit coupled at one side to the temperature sensor and at another side to the coil.

In particular, the control unit is configured so that once it has received the starting input of the pumping group it compares the temperature measured by the temperature sensor with a threshold value, and if the temperature measured by the temperature sensor proves to be less than the threshold value, the control unit commands a delay of the starting of the pumping group of a period wherein the control unit supplies electrical current to the coil.

The method implemented by the group described above thus comprises the steps of:
 sending the temperature measured by the temperature sensor to the control unit once the control unit has received the starting input of the pumping group;
 comparing the temperature measured by the temperature sensor with the threshold value, generally the CFPP temperature of paraffin generation;
 if the temperature measured by the temperature sensor is less than the threshold value, commanding a delay of the starting of the pumping group of a period and supplying electrical current to the coil for at least part of said period.

In this way, the Joule effect means that the coil supplied with electrical current heats up, leading to the filter associated with the metering unit also heating up, thus breaking up any paraffin deposited owing to the ambient temperature being lower than the CFPP temperature.

In particular, the valve body comprises a first portion, arranged inside the electromagnetic head and wrapped by the coil, and a second portion arranged outside the electromagnetic head and provided with side openings for the diesel flow. The filter being associated to the second portion of the valve body at these side openings.

In this way, both the coil and the filter are associated with the same element, the valve body, in mutual proximity in order to maximize the heat exchange between the coil and the filter.

In particular, the group comprises a temperature sensor for measuring the temperature of the filter, the temperature sensor being connected to the control unit so that the supply of the electrical current to the coil before the starting of the pumping group ends only when the temperature of the filter reaches a threshold value.

The method implemented by the variant described above thus comprises the steps of:
 sending the temperature measured by the temperature sensor to the control unit during the preliminary supply of electrical current to the coil;
 comparing the temperature measured by the temperature sensor with a threshold value, which may be the one at the start of electrical current supply or different;
 if the temperature measured by the temperature sensor is greater than the threshold value, providing for an end to the preliminary supply of electrical current to the coil and starting the pumping group without further delay.

In this way, the preliminary supply of electrical current to the coil is interrupted only when it is certain that the desired result has been achieved, that is to say that the filter has heated up such as to dissolve any paraffin residues from condensation of the diesel.

Alternatively, the period for delaying the starting of the pumping group, and also the time of preliminary supply of electrical current to the coil, may be evaluated a priori, for example depending on the ambient temperature.

In this way, it is possible to achieve a good compromise in terms of dissolution of the paraffin and in terms of the waiting required by the user as a delay for starting the engine.

In particular, the group can comprise a temperature sensor for measuring the temperature associated with the coil, or with the electromagnetic head in general, the temperature sensor being connected to the control unit so that the supply of the electrical current to the coil before the starting of the pumping group ends only where the temperature measured by said sensor reaches a threshold value.

This makes it possible to achieve the desired result, that is heating of the filter so as to dissolve any paraffin residues from condensation of the diesel, by keeping the temperature of the electromagnetic head under control, and thereby avoiding any excessive local overheating. This embodiment is also easy to implement since it is generally the electromagnetic head which is flange-mounted to the outside of the pump body.

Finally, the coil can be supplied with electrical current using the wires already present in the metering unit for connection to the coil, or it is possible to provide wires dedicated to and able to supply electrical current from the control unit to the coil having amperage more than 2 A.

BRIEF DESCRIPTION OF THE DRAWINGS

Further features and advantages of the present invention will become clear from the following description of a non-limiting exemplary embodiment thereof, with reference to the figures of the accompanying drawings, in which:

FIG. 1 is a schematic perspective view of a metering unit, or throttle valve, which is provided with the respective filter and is arranged in the pumping group for pumping the diesel along the low pressure circuit between the low pressure pump and the high pressure pump;

FIG. 2 is a schematic view of the group for unclogging the filter according to the present invention, wherein the metering unit shown in FIG. 1 with the respective filter is schematized in section.

In the figures, reference numeral 1 denotes an embodiment of the group for unclogging a filter of a pumping group for pumping diesel to an internal combustion engine according to the present invention, with reference numeral 2 denoting the metering unit with which the filter to be unclogged is associated, and with reference numeral 30 denoting said filter.

DETAILED DESCRIPTION

The metering unit 2, or throttle valve, is part of a pumping group which collects diesel from a tank, supplies it in series to a low pressure gear pump and to a high pressure pump with pumping pistons, before conveying it toward a common tank connected to a series of injectors.

In particular, the metering unit 2 is arranged along the low pressure circuit, which connects the low pressure pump to the high pressure pump and has the task of controlling the supply of the high pressure pump.

To this end, the group 1 comprises a control unit 31 which is able to control the metering unit 2 as a function of signals received from sensors that can measure, in a known manner, various parameters linked to the operation of the engine. In addition to having the function mentioned above, the metering unit 2 can also operate as an overflow device with the task of "draining", in use, the quantity of fuel which the low pressure pump supplies to the metering unit 2 which is surplus to the requirements of the high pressure pump, and of ensuring in this way that the pressure of the fuel at the inlet of the metering unit 2 is maintained consistently about a preset value.

As is shown schematically in the figures, the metering unit 2 is formed by an electrovalve, with at least one inlet side in communication with the outlet of the low pressure pump and at least one outlet side in communication with the inlet of the high pressure pump or with a discharge branch.

The metering unit 2 is flange-mounted on a supporting body 3, which is normally part of the body of the high pressure pump, and comprises an electromagnetic head 4 and a control valve 5. The electromagnetic head 4 comprises a coil 6, which is wound up onto a tubular body 7 made of nonmagnetic material and coaxial with an axis 8, a tubular bush 9 positioned inside the tubular body 7, and a movable core 10 made of magnetizable material. The core 10 is mounted so as to be axially slidable along the tubular bush 9, and comprises a tubular shank 11 and a strut 12 which is integral with the tubular shank 11 and coaxial with the axis 8 and with the tubular bush 9. The electromagnetic head 4 furthermore comprises a closing cup 13, which bears, connected at one end, an electrical connector 14 and which is provided, at the opposite end, with an outer flange 15 for the connection of the metering unit 2 to the supporting body 3. On the inside of the closing cup 13, provision is made of a bearing 16 having the function of axially guiding the strut 12 along the axis 8. The control valve 5 comprises a valve body 17 provided with an intermediate outer flange 18, which extends radially on the inside from the flange 15 into a position coaxial with the axis 8, is blocked by the closing cup 13 in contact with the supporting body 3, and defines, on the valve body 17, two opposing portions 19 and 20, which are substantially cylindrical and coaxial with the axis 8 and are arranged respectively on the outside and on the inside of the supporting body 3 or of the electromagnetic head 4.

In particular, the portion 19 extends from the flange 18 towards the movable core 10 inside the electromagnetic head 4 and is engaged sealingly, with the interposition of an O-ring 21, on the inside of the tubular body 7 in such a way as to define, together with the tubular bush 9 and with the closing cup 13, the housing and sliding seat for the movable core 10.

The portion 20 on the outside of the electromagnetic head 4 is engaged, with the interposition of two O-rings 22, on the inside of a cylindrical seat (not shown) formed in the supporting body 3, is coaxial with the axis 8, and communicates with a series of lower doors 23 and side doors 24 which function as inlets and outlets for the low pressure diesel.

In particular, the inside of the portion 20 of the valve body 17 is provided with a cavity 26, in which a movable shutter 27 can slide along the axis 8 between at least one raised position and at least one lowered position for controlling the flow of the low pressure diesel between the inlet and outlet doors 23, 24 of the valve body 17.

In particular, the cavity 26 forms a duct 25 which is open at the bottom at a lower door 23 and is connected to two side channels 24 substantially at half the height of the lower portion 20.

The valve 5 comprises a connector 28 coupled to the valve body 17 inside the cavity 26 at the lower inlet or door 23. The connector 28 is hollow and allows for passage of the fuel. The valve 5 comprises an elastic system 29, in particular a helical spring, which is interposed between the shutter 27 and the connector 28. The elastic system 29 exerts an axial force which presses the shutter 27 away from the lower inlet 23 and keeps the shutter 27 bearing against the strut 12.

By supplying electrical current to the coil 6, an activity which is controlled by the control unit 31, what is generated is a magnetic field which, in interaction with the movable core 10, moves the shutter 27 as a result of the motion of the strut 12, thereby controlling in a desired manner the flow of low pressure diesel between the inlets and the outlets of the valve body 17.

At at least one section of the portion 20 of the valve body 17, provision is made of a filter 30 arranged in a manner coupled, in a known manner, externally to the valve 5.

In particular, the filter 30 is externally coupled to the valve body 17 along a first section which extends from the flange 18 to the inside of the supporting body 3 and intercepts at least the side channels 24.

In the example illustrated, the filter 30 is in the form of a sleeve and comprises a cylindrical cage 32 which supports a filtering wall 33 in the form of a net or grid.

As can be seen in FIG. 2, the filter 30 is arranged with respect to the flange 18 on the opposite side with respect to the coil 6 in such a way that both the coil 6 and the filter 30 have ends close to the flange 18.

As mentioned above, the control unit 31 controls and commands the supply of the electrical current to the coil 6 by moving the strut 12 as a function of parameters linked to the operation of the engine measured by specific sensors.

According to the invention, the apparatus for unclogging the filter 30 comprises a sensor 34 for measuring the external ambient temperature, which is connected to the control unit 31 by means of designated wiring cables or wirelessly.

This connection has been schematized in FIG. 2 with reference numeral 35. In particular, this sensor 34 is configured to send to the control unit 31, on the request of said control unit 31, the measured or calculated value of the external ambient temperature at the instant at which the operator sends to the control unit 31 the command for starting the engine and therefore the pumping group in which the metering unit 2 is installed.

Once it has received the required information relating to the ambient temperature from the sensor 34, the control unit 31 compares, possibly subject to processing, said temperature data with a reference temperature threshold value. This reference threshold temperature corresponds to or is a function of the CFPP transition temperature of the diesel from a liquid state to paraffin.

If the ambient temperature data is greater than said reference temperature threshold value, the control unit 31 sends the command for normal starting to the engine and consequently will supply electrical current to the coil 6 in a known manner depending on the required flow of diesel which has to pass from the valve 5.

If the ambient temperature data is less than said reference temperature threshold value, the control unit 31 does not send the normal starting signal to the engine, but supplies the coil 6 with electrical current through wires 36 which can be uniquely intended for this purpose or can consist of the wires for supplying power to the coil 6 which are already present in the system.

In particular, the control unit 31 therefore provides to delay the starting of the engine and to supply electrical current, for example an electrical current having amperage more than 2 A, to the coil 6 for a predetermined period, before commanding the starting of the engine and of the systems connected thereto, including the pumping group for pumping the diesel, which collects the diesel from the tank and supplies it to the injectors. As mentioned above, this procedure for the preliminary supply of electrical current to the coil 6 before starting the pumping group is carried out when the ambient temperature measured by the sensor 34 is less than the temperature of transition of the diesel from a liquid state to paraffin, i.e. during what is termed "cold starting".

By supplying electrical current to the coil 6 before starting the pump, and generally the engine, the coil 6 is heated up by the Joule effect and transmits at least part of this heat to the filter 30 which, with respect to the coil 6, is located beyond the flange 18 of the valve body 17.

By heating up the filter 30, any paraffin deposits which clog the filter are dissolved, allowing for the correct flow of diesel through the filter 30 and the metering unit in general.

The duration of this preliminary supply of electrical current to the coil 6 may be a time which is fixed and defined a priori, or may be variable depending on a number of factors.

Factors which may influence the duration of the preliminary supply of electrical current to the coil 6 may be the differential between the temperature measured by the sensor 34 and the threshold value, or design parameters linked to the type of engine, or other parameters.

Alternatively, the duration of the preliminary supply of electrical current to the coil 6 may also not be defined a priori, but may be a function of parameters measured during the supply of electrical current so as to thereby optimize the process. Indeed, the filter 30 and/or the coil 6 may be associated to corresponding sensors 39 40 for measuring the temperature in such a way that the preliminary supply of electrical current to the coil 6 may be interrupted only when a determined temperature of the filter and/or of the coil is reached.

The connection between said sensors 39 40 and the control unit 31 is schematized in FIG. 2 with reference numerals 38, 39, and may comprise wiring or wireless data transmission.

Since the delay in starting with respect to the starting input issued by the user is of the order of a few seconds which are necessary to heat up the coil 6 by the Joule effect, this delay is to be considered acceptable by the user given the major advantages which arise therefrom.

It is evident that the group for unclogging a filter of a pumping group for pumping diesel to an internal combustion engine according to the present invention described here may be subject to modifications and variations without thereby departing from the scope of protection of the accompanying claims.

What is claimed is:

1. An unclogging group for unclogging a filter along a fluid circuit for pumping diesel to an internal combustion engine with a low pressure pump and a high pressure pump, the fluid circuit configured to connect the low pressure pump to the high pressure pump, the unclogging group (1) comprising:
   a metering unit (2) supplied by diesel from the low pressure pump and configured for feeding the diesel to the high pressure pump; the metering unit (2) comprising an electromagnetic head (4) provided with a coil (6) and a control valve (5) for controlling a diesel flow;
   a filter (30) associated with the control valve (5);
   a temperature sensor (34) for measuring an ambient temperature;
   a control unit (31) coupled at one side to the temperature sensor (34) and at another side to the coil (6);
   wherein the control unit (31) is configured so that once the control unit (31) has received a starting input of the low pressure pump and the high pressure pump, the control unit (31) compares the temperature measured by the temperature sensor (34) with a threshold value, and if the temperature measured by the temperature sensor (34) is less than the threshold value the control unit (31) commands a delay of starting of the low pressure pump and the high pressure pump for a period, wherein the period extends from the time the control unit (31) receives the starting input until the temperature measured by the temperature sensor (34) is greater than the threshold value, and wherein the control unit (31) supplies electrical current to the coil (6) during the period to heat up the coil (6) leading to the filter (30) such that the filter (30) is heated for unclogging of the filter (30).

2. The group as claimed in claim 1, wherein the control valve (5) comprises a valve body (17), the valve body (17) comprises a first portion (19), arranged inside the electromagnetic head (4) and wrapped by the coil (6), and a second portion (20) arranged outside the electromagnetic head (4) and provided with side openings (24) for the diesel flow; the filter (30) being associated with the second portion (20) of the valve body (17) at the side openings (24).

3. The group as claimed in claim 1, wherein the temperature sensor (34) is a first temperature sensor (34) and the threshold value is a first threshold value, and wherein the unclogging group (1) comprises a second temperature sensor (39) for measuring a temperature of the filter (30); the second temperature sensor (39) being connected to the control unit (31) so that a supply of the electrical current to the coil (6) before the starting of the low pressure pump and the high pressure pump ends only when the temperature of the filter (30) reaches a second threshold value.

4. The group as claimed in claim 1, wherein the temperature sensor (34) is a first temperature sensor (34) and the threshold value is a first threshold value, and wherein the unclogging group (1) comprises a second temperature sensor (40) associated with the electromagnetic head (4), the second temperature sensor (40) being connected to the control unit (31) so that a supply of the electrical current to the coil (6) before the starting of the low pressure pump and the high pressure pump ends only when the measured temperature of the electromagnetic head (4) reaches a second threshold value.

5. The group as claimed in claim 1, wherein the unclogging group (1) comprises wires (36) for feeding electrical current from the control unit (31) to the coil (6), the wires being configured for supplying electrical current having amperage more than 2 A.

6. A method for unclogging a filter of a fluid circuit for pumping diesel to an internal combustion engine with a low pressure pump and a high pressure pump, the fluid circuit configured to connect the low pressure pump to the high pressure pump, the method comprising the steps of:
a) providing:
a metering unit (2) supplied by diesel from a low pressure pump and configured for feeding the diesel to a high pressure pump; the metering unit comprising an electromagnetic head (4) provided with a coil (6) and a control valve (5) for controlling the diesel flow;
a filter (30) associated with the control valve (5);
a temperature sensor (34) for measuring an ambient temperature;
a control unit (31) coupled at one side to the temperature sensor (34) and at another side to the coil (6);
b) sending the temperature measured by the temperature sensor (34) to the control unit (31) once the control unit (31) has received a starting input of the low pressure pump and the high pressure pump;
c) comparing the temperature measured by the temperature sensor (34) with a threshold value; and
d) if the temperature measured by the temperature sensor (34) is less than the threshold value, commanding a delay of starting of the low pressure pump and the high pressure pump fora period and supplying electrical current to the coil (6) for at least part of said period to heat up the coil (6) leading to the filter (30) such that the filter (30) is heated for unclogging the filter (30), wherein the period extends from the time the control unit (31) receives the starting input until the temperature measured by the temperature sensor (34) is greater than the threshold value.

7. The method as claimed in claim 6, wherein the method comprises the step of calculating a delay period depending on the temperature measured by the temperature sensor (34).

8. The method as claimed in claim 6, wherein the temperature sensor (34) is a first temperature sensor (34) and the threshold value is a first threshold value, and wherein the method comprises the steps of:
e) providing a second temperature sensor (39) for measuring a temperature of the filter (30);
f) sending the temperature measured by the first temperature sensor (39) to the control unit (31) during a preliminary supply of the electrical current to the coil (6);
g) comparing the temperature measured by the second temperature sensor (39) with a second threshold value; and
h) if the temperature measured by the second temperature sensor (39) is more than the second threshold value, ending the preliminary supply of the electrical current to the coil (6).

9. The method as claimed in claim 8, wherein the first threshold corresponds to the second threshold value.

10. The method as claimed in claim 6, wherein the temperature sensor (34) is a first temperature sensor (34) and the threshold value is a first threshold value, and wherein the method comprises the steps of:
e) providing a second temperature sensor (40) for measuring a temperature of the electromagnetic head (4);
f) sending the temperature measured by the second temperature sensor (40) to the control unit (31) during a preliminary supply of the electrical current to the coil (6);
g) comparing the temperature measured by the second temperature sensor (40) with a second threshold value; and
h) if the temperature measured by the third temperature sensor (40) is more than the second threshold value, ending a preliminary supply of the electrical current to the coil (6).

* * * * *